UNITED STATES PATENT OFFICE.

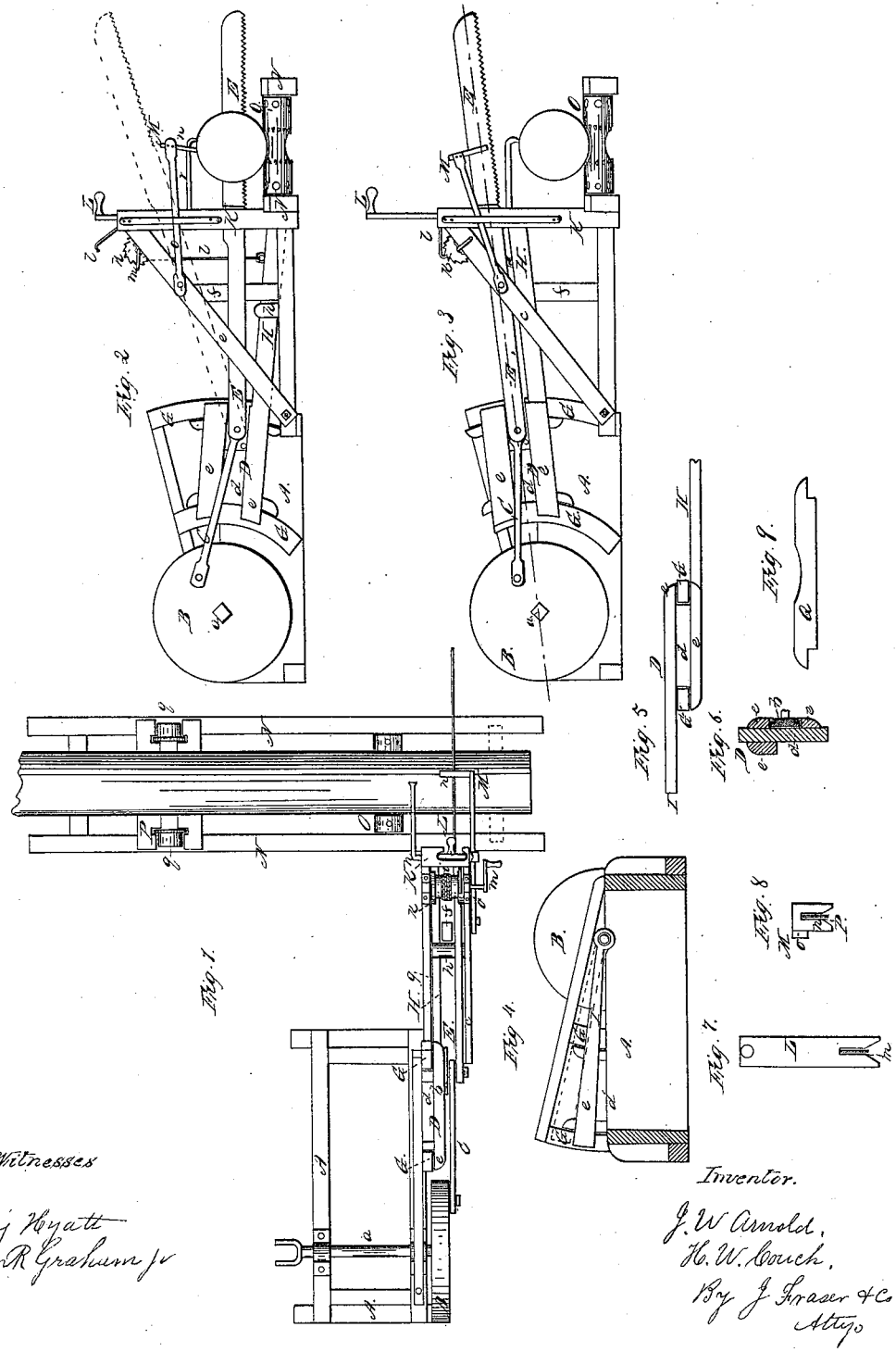

J. W. ARNOLD AND H. W. COUCH, OF WEST MACEDON, NEW YORK.

IMPROVEMENT IN SAWING-MACHINES.

Specification forming part of Letters Patent No. 43,963, dated August 30, 1864.

*To all whom it may concern:*

Be it known that we, J. W. ARNOLD and H. W. COUCH, of West Macedon, in the county of Wayne and State of New York, have invented certain new and useful Improvements in Machines for Sawing Logs, &c.; and we do hereby declare that the following is a full and exact description thereof, reference being had to the accompanying drawings, making part of this specification.

Figure 1 is a plan of our improved machine; Fig. 2, a side elevation thereof, with the saw lowered in the act of cutting a log; Fig. 3, a similar view, but with the saw raised away from the log; Fig. 4, an elevation of the frame, driving-wheel, adjustable gate, and the parts connected therewith, looking on the opposite side from Figs. 2 and 3; Fig. 5, a plan of the adjustable gate and its concentric guides or ways detached; Fig. 6, a vertical cross section of the gate; Fig. 7, a view of the pressure-slide and the saw-blade resting therein; Fig. 8, view of the hinged saw-guide; Fig. 9, view of the bar for supporting the last cut of the log.

Like letters of reference indicate corresponding parts in all the figures.

Our improvement is of that class where a crosscut or "drag" saw is employed, driven by suitable machinery; and our invention consists, essentially, in the employment of a vertically-adjustable gate, concentric with the axis of the crank-wheel, in which gate plays the pitman slide or wrist, in such a manner that when raised the saw will not rock or "jump;" also, in the use of a hinged guide to hold the saw when raised, and other parts hereinafter fully set forth.

As represented in the drawings, a suitable frame, A, conveniently in the form of a box, is provided, in which is mounted a shaft, $a$, having a balance-wheel, B, at one side, driven by any suitable means. To this wheel is jointed a pitman, C, forming a crank, the opposite end of the pitman being similarly jointed to a wrist-slide, $b$, of a gate, D. The end of the shank E of the saw is also jointed to the slide $b$, preferably on the same center, so that as the slide is operated by pitman C the saw receives the desired reciprocation. The saw-shank runs between suitable guides, $c\ f$, to keep it in place and cause it to play truly. The gate D in which the wrist-slide $b$ works is made to adjust up or down vertically, so that when the saw is raised away from the log and runs loose it should stand on a line with the center of the balance-wheel, as indicated by the central red line in Fig. 3. To accomplish this vertical adjustment in the simplest and easiest manner, and so that the saw may be raised while it is running, we prefer to make the gate concentric with the axis of the balance-wheel, and to fit it between suitable similarly concentric ways or guides, G G.

As represented in the drawings, the gate is composed of a plane center board, $d$, fitting between the ways or guides, to which board are secured on either side cleats $e\ e$, which overlap the ways or guides, and thus hold the parts in connection. Any equivalent construction may be employed. On the inside, or the side shown in Fig. 4, the cleat $e$ is elongated, so as to form an arm, I, that extends back to the axis $a$, around which it turns, or at which point it is suitably jointed, so as to form a guide to the turning motion of the gate in adjusting. On the opposite or outer side of the gate the lower cleat, $e$, is prolonged or extended forward a suitable distance, forming a bar, H, resting side by side with the saw-shank E and kept in place laterally by suitable guides, $f\ g$, similarly to the saw-shank. At a suitable position this bar is provided with a horizontal support or pin, $h$, Figs. 1 and 2, that projects and rests under the saw-shank, so that when the bar is raised the saw will also be raised with it. The support $h$ allows the saw-shank to work freely on it.

To the bar H is secured a cord, $i$, passing upward around a spool or pulley, $k$, having ratchet-teeth, into which catches a pawl, $l$, and provided with a winch, $m$, or equivalent, by which it is operated. By this arrangement it will be seen that the saw can be raised or lowered at pleasure without stopping the machine or interfering with the reciprocations of the same.

By the employment of the adjustable gate D, in connection with the saw, balance-wheel, and other connecting parts, before described, we secure a great advantage; for when the saw is raised away from the log it runs on a line with the axis of the balance-wheel, so as to prevent "rocking" or "jumping." To illustrate: In ordinary machines of this class the gate D is stationary, and stands about in the position indicated in Fig. 2, or so that the saw, when cutting in the log, is a little elevated above a parallel line with the gate, to give a slight rocking or oscillating movement to the saw to clear the kerf more perfectly from dust. When elevated, as in red lines, and sustained by the spool $k$, it is obvious that the saw will receive a violent rocking, jumping, or oscillating motion, as indicated by the red arrows, which motion not only causes a great strain on the parts, but especially renders the machine very dangerous to the workmen. In our device this difficulty is obviated, for by raising the gate D in the same proportion that the saw is raised, as indicated in Fig. 3, the saw stands on an exact line with the axis of the driving-wheel, which gives motion to it, and therefore, there is no rocking or jumping motion, but the same is uniform, regular, and unvarying. In addition to this advantage, we can by this means lower the gate exactly as is desired in feeding the saw, so that the necessary rocking motion, and no more, will be produced in the kerf to free it of dust.

In ordinary devices where the gate is fixed, if the log to be sawed is a very large one, the saw is so elevated at first in cutting that it receives an unnecessary vibration; and if the log is very small the vibration is not sufficient. It is obvious that by adjusting the gate we can gage the action of the saw exactly as desired. The arm I, connecting the gate with the axis of the driving-wheel, enables the gate to be adjusted up or down and retained at the same distance from the wheel, so that the pitman C will act regularly and uniformly, and so that the slide $b$ will always work in the same path in the gate. The bar H, by extending forward, forms a stiff or rigid connection of the gate, so that the same may be adjusted by the spool. Its relative situation with the saw E is also such that when the saw-shank rests on the support $h$ the saw will be on a line with the gate. The guides $c\,g$ also serve as braces to a standard, K, through which the saw runs. Vertically in this standard is situated a slide, L, which moves freely up and down in a groove or equivalent. This slide is provided with a suitable handle at its top and a slot, $m'$, at its bottom, which receives the saw-blade. By bearing with the hand on the handle pressure may be applied on the saw, so as to cut more rapidly and with greater effect. A guide, M, consisting of a head, $n$, and a shank, $o$, pivoted to the brace $c$, is also employed, the head having a slot, $p$, which receives the back of the saw-blade, as shown most clearly in Fig. 8. Being thus hinged, this guide rises and falls with the saw. When raised, it forms a guide for the outer end of the saw, which would otherwise play irregularly; but when lowered it strikes on the top of the log, Fig. 2, while the saw cuts into the log free of it. When the saw is raised, it again strikes the inclined sides of the slot $p$. This arrangement is very convenient and effective, and by acting automatically saves much trouble and labor. The log is brought into position for being acted on by means of a track, N, having at a suitable position near the saw a lever-roller, O, armed with points; and at the rear a carriage, P, consisting of a suitable plank or timber, resting at the middle on friction-wheels $q\,q$. The plank or timber sweeps off such chips or other bodies as fall on the track, so that the wheels will run clear. In its action it is superior to a carriage resting on four wheels. The log is held from rolling by means of a hinged dog, $r$, Figs. 1, 2, and 3, which is made adjustable in the standard K to adapt it to different-sized logs. In the last cut of the log the overhanging end is sustained by a removable bar, Q, Fig. 9.

What we claim as our invention, and desire to secure by Letters Patent, is—

1. The vertically-adjustable gate D, with its slide $b$, in combination with the saw E, pitman C, and driving-wheel B, in such a manner that when raised away from the log the saw may run on a line toward the axis of the driving-wheel, but when lowered it may produce a slight rocking motion to clear the kerf, substantially as herein set forth.

2. In combination with the gate D, saw E, and driving-wheel B, the arm I and bar H, the latter provided with the support $h$ or equivalent, the whole arranged substantially in the manner and for the purpose herein specified.

3. The arrangement of the gate D, ways G G, arm I, and bar H, saw E, hinged guide M, and pressure-slide L, substantially as and for the purpose herein set forth.

In witness whereof we have hereunto signed our names in the presence of two subscribing witnesses.

J. W. ARNOLD.
H. W. COUCH.

Witnesses:
J. W. BRIGGS,
F. E. HOOKER.